United States Patent
Parra et al.

(10) Patent No.: US 9,424,209 B2
(45) Date of Patent: Aug. 23, 2016

(54) DYNAMIC HETEROGENEOUS HASHING FUNCTIONS IN RANGES OF SYSTEM MEMORY ADDRESSING SPACE

(71) Applicants: Jorge E. Parra, El Dorado Hills, CA (US); Joydeep Ray, Folsom, CA (US); Ramadass Nagarajan, Portland, OR (US)

(72) Inventors: Jorge E. Parra, El Dorado Hills, CA (US); Joydeep Ray, Folsom, CA (US); Ramadass Nagarajan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 352 days.

(21) Appl. No.: 14/031,398

(22) Filed: Sep. 19, 2013

(65) Prior Publication Data
US 2015/0082002 A1    Mar. 19, 2015

(51) Int. Cl.
G06F 12/00    (2006.01)
G06F 13/16    (2006.01)
G06F 12/06    (2006.01)

(52) U.S. Cl.
CPC ........... G06F 13/16 (2013.01); G06F 12/0607 (2013.01)

(58) Field of Classification Search
CPC .......................... G06F 12/0607; G06F 13/16
See application file for complete search history.

(56) References Cited

U.S. PATENT DOCUMENTS

| | | | | |
|---|---|---|---|---|
| 8,438,320 B2* | 5/2013 | Srinivasan | .......... | G06F 12/0607 710/33 |
| 2009/0235020 A1* | 9/2009 | Srinivasan | .......... | G06F 12/0607 711/106 |
| 2010/0037024 A1* | 2/2010 | Brewer | ............... | G06F 12/0851 711/127 |
| 2011/0161553 A1* | 6/2011 | Saxena | ............... | G06F 12/0246 711/103 |
| 2012/0079177 A1* | 3/2012 | Brewer | ............... | G06F 12/0851 711/103 |
| 2012/0278651 A1* | 11/2012 | Muralimanohar | ..... | G11C 29/76 714/6.11 |
| 2015/0078375 A1* | 3/2015 | Hendel | ............... | H04L 45/7453 370/389 |

OTHER PUBLICATIONS

Tetsuhide Senta, Interleaving and Hashing for Start System, Aug. 10, 1991, Laboratory for Computer science, MIT, pp. 1-47.*

* cited by examiner

*Primary Examiner* — Reginald Bragdon
*Assistant Examiner* — Medhi Namazi
(74) *Attorney, Agent, or Firm* — Lowenstein Sandler LLP

(57) ABSTRACT

Dynamic heterogeneous hashing function technology for balancing memory requests between multiple memory channels is described. A processor includes functional units and multiple memory channels, and a memory controller unit (MCU) coupled between them. The MCU includes a dynamic heterogeneous hashing module (DHHM) that includes multiple specific-purpose hashing function blocks that define different interleaving sequences for memory requests to alternately access the multiple memory channels. The DHHM also includes a hashing-function selection block. The hashing-function selection block is operable to identify a requesting functional unit originating a current memory request and to select one of the specific-purpose hashing function blocks for the current memory request in view of the requesting functional unit.

23 Claims, 12 Drawing Sheets

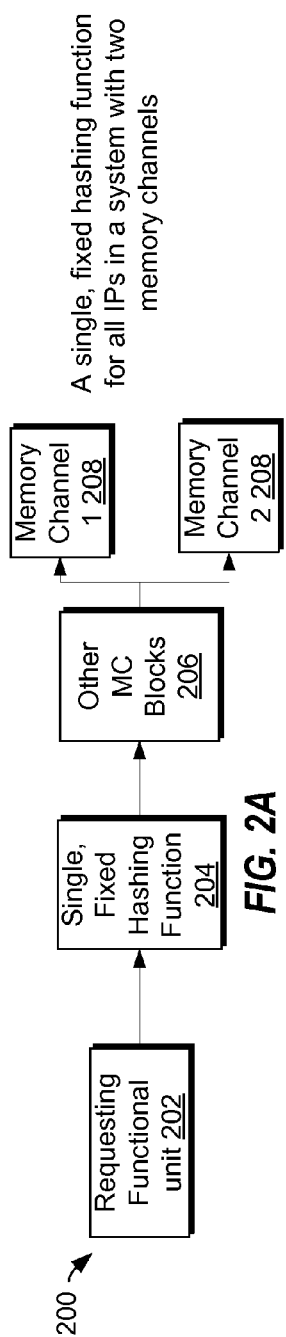
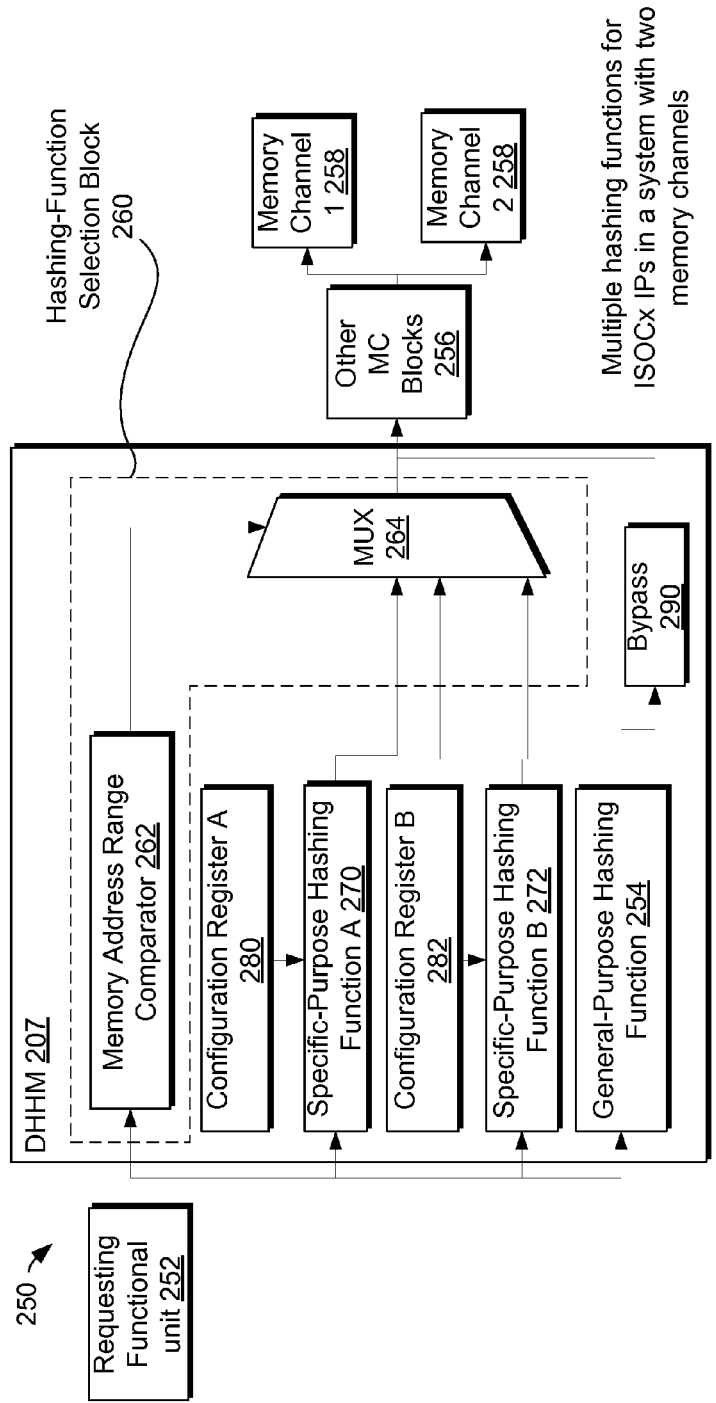

DYNAMIC HETEROGENEOUS HASHING FUNCTIONS IN RANGES OF SYSTEM MEMORY ADDRESSING SPACE

Embodiments described herein generally relate to processing devices and, more specifically, relate to dynamic heterogeneous hashing architectures and operating the same.

BACKGROUND

In computing, memory refers to the physical devices used to store programs (e.g., sequences of instructions) or data (e.g. program state information) on a temporary or permanent basis for use in a computer or other digital electronic devices. The terms "memory," "main memory" or "primary memory" can be associated with addressable semiconductor memory, i.e. integrated circuits consisting of silicon-based transistors, used for example as primary memory in computers.

BRIEF DESCRIPTION OF THE DRAWINGS

FIG. 2A is a block diagram of a conventional system with a fixed hashing function for two memory channels according to one implementation.

FIG. 2B is a block diagram of a DHHM with multiple specific-purpose hashing function blocks and a hashing-function selection block according to one embodiment.

DESCRIPTION OF EMBODIMENTS

Figure 1:
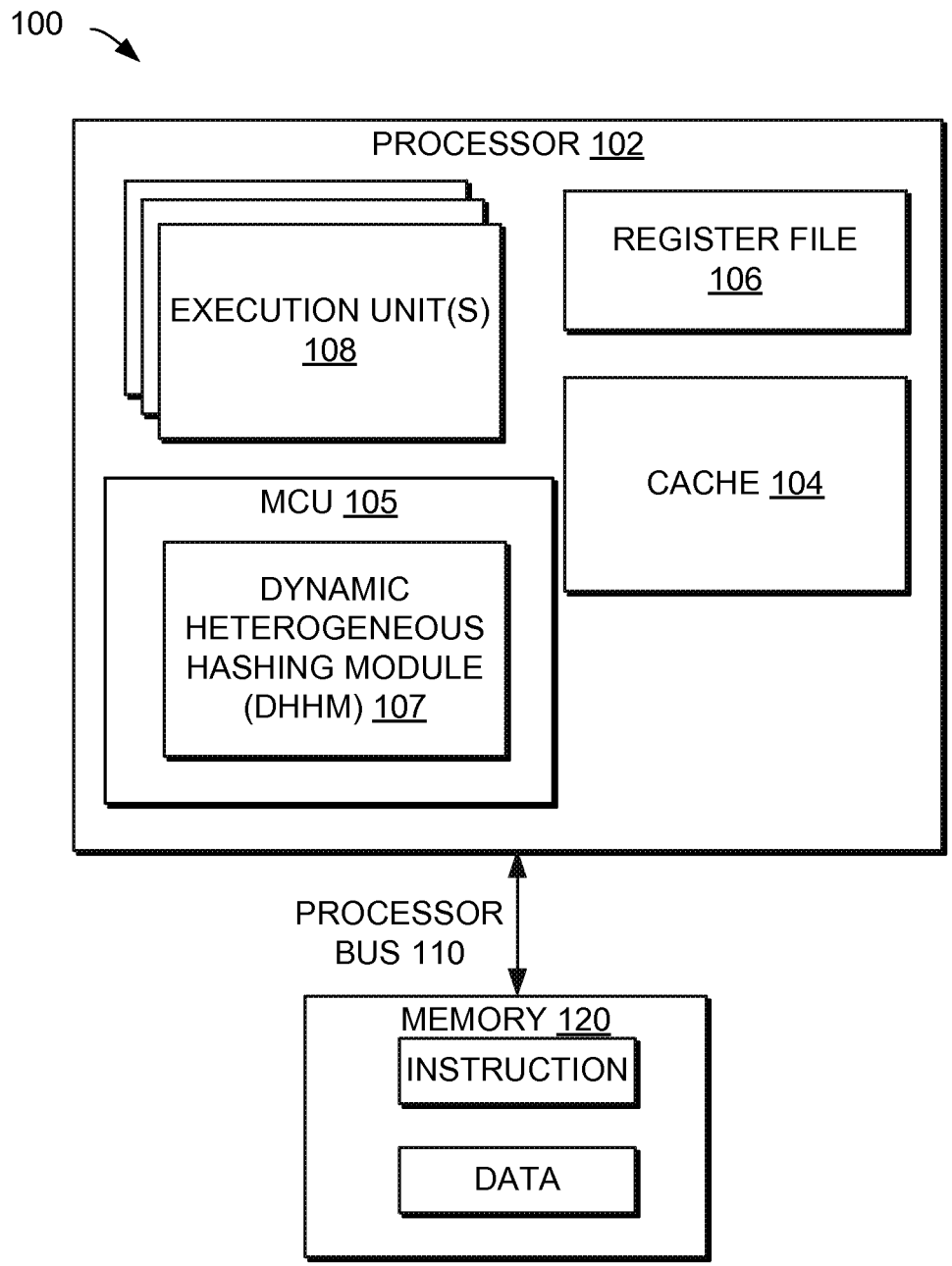
FIG. 1 is a block diagram illustrating a computing system that implements a memory controller unit (MCU) with a dynamic heterogeneous hashing module (DHHM) for dynamic hashing according to one embodiment.

Dynamic heterogeneous hashing technology for balancing memory requests between multiple memory channels is described. A processor includes multiple functional units and multiple memory channels, and a memory controller unit (MCU) coupled between them. The MCU includes a dynamic heterogeneous hashing module (DHHM) that includes multiple specific-purpose hashing function blocks that define different interleaving sequences for memory requests to alternately access the multiple memory channels. The DHHM also includes a hashing-function selection block. The hashing-function selection block is operable to identify a requesting functional unit originating a current memory request and to select one of the specific-purpose hashing function blocks for the current memory request in view of the requesting functional unit.

Modern microprocessor-based products, such as System on Chip (SoC), Clients, Servers and Hardware accelerators, may feature a large diversity of functional units, such as intellectual property (IP) cores. An IP core is a reusable unit of logic, cell or chip layer design that is the intellectual property of one party. The tasks that these functional units execute are also very diverse and therefore, the transactions to the system's memory that they request do not exhibit homogeneous addressing patterns. Current architectures are designed to feature a single path to memory which services all the system component's memory transactions. This path is optimized to deliver the highest performance to the most common addressing patterns. However, the IP cores that generate transactions whose addressing patterns deviate from the general case can suffer from performance degradation or may not efficiently utilize the memory path. The embodiments described herein address this problem by segmenting the system memory space into several regions, each region corresponding with a programmable hash function, including one or more specific-purpose hashing functions and a general-purpose (default) hashing function.

One goal in design of a memory system is to create a configuration that services data requests from every client with the lowest possible latency. Current memory technologies provide high-capacity, low-cost DRAM memory modules that need to be interleaved to achieve the required bandwidth and latencies. It is common to have systems with multiple DRAM channels that are alternately accessed. Therefore, while a channel is busy retrieving or writing a data page, another data request can be scheduled in another channel. The resulting effect of this strategy allows the processor to obtain a continuous stream of data pages to or from the memory system. The embodiments described herein provide multiple specific-purpose hashing functions, as well as a default general-purpose hashing function, which can be selected to determine how the memory channels are alternately accessed, as described in more detail herein. The physical memory can be segmented into multiple memory regions, where each of the memory regions corresponds to one of the specific-purpose hashing functions and the general-purpose hashing function as described herein.

FIG. 1 is a block diagram illustrating a computing system 100 that implements a memory controller unit (MCU) 105 with a dynamic heterogeneous hashing module (DHHM) 107 for dynamic hashing according to one embodiment. The computing system 100 is formed with a processor 102 that includes one or more execution units 108 to execute an instruction and the MCU 105 that implements one or more features in accordance with one or more embodiments as described herein. In short, the MCU 105 coordinates memory accesses to the system memory 120 via multiple memory channels and the DHHM 107 coordinates which hashing functions to use to balance memory accesses to the system memory 120. Additional details regarding the DHHM 107 are described in more detail below with respect to FIGS. 2A-5.

Computing system 100 includes a component, such as a processor 102 to employ execution units 108 including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, a I/O controller, etc. These elements perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, configuration registers, and instruction pointer register.

Execution unit 108, including logic to perform integer and floating point operations, also resides in the processor 102. It should be noted that the execution unit may or may not have a floating point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102. The processor 102 is coupled to the memory 120 via a processor bus 110. A system logic chip, such as a memory controller hub (MCH) may be coupled to the processor bus 110 and memory 120. An MCH can provide a high bandwidth memory path to memory 120 for instruction and data storage and for storage of graphics commands, data and textures. The MCH can be used to direct data signals between the processor 102, memory 120, and other components in the system 100 and to bridge the data signals between processor bus 110, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the MCU 105 can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 2A is a block diagram of a conventional system 200 with a fixed hashing function 204 for two memory channels 208 according to one implementation. In the conventional system 200, a requesting functional unit 202 requests access to the memory via one of the memory channels 208 and the single fixed hashing function 204 is used to determine which memory channel 208 is used. The interleaving sequence of the memory banks is based on the output of a fixed hashing function 204 fed the addresses of the data pages being requested. This hashing function 204 is chosen based on the characteristics of the sequence of addresses being requested to the memory system. For example, if most of the requests are being made to sequential pages in the memory, the best hashing function in a dual channel system is to issue odd addresses to one channel and even addresses to the other channel. Extensive simulations are performed while designing a system to identify the most common addressing patterns and therefore, to choose the best hashing functions that in average produce the best balanced channel utilizations. Once the best hashing function is chosen, the hashing function is programmed as the single fixed hashing function 204. However, current aggressive systems integrations are evolving SoC and Client microprocessors into a massive collection of general-purpose IPs that need to be serviced by a single memory system. It has been observed that the characteristics of the transactions that such diverse group of IP cores request to the memory system are very heterogeneous making impossible to find a single hashing function that optimizes the balanced use of the memory channels.

The embodiments described herein assign one or more private regions of memory to one or more specific types of ISOC IP cores, such as those that consume high bandwidth and that disrupt the general case of homogenous requesting patterns. The requests from these identified IP cores can be processed by independent specific-purpose hashing functions that are more suitable to optimize the channel utilization under the requesting IP core's particular requesting patterns, such as illustrated in FIG. 2A.

FIG. 2B is a block diagram of a DHHM 207 with multiple specific-purpose hashing function blocks 270, 272 and a hashing-function selection block 254 according to one embodiment. The DHHM 207 includes a hashing-function selection block 260, multiple specific-purpose hashing function block 270, 272 and the general-purpose hashing function block 254. The specific-purpose hashing function blocks 270, 272 define different interleaving sequences for memory requests by the requesting functional unit 254 to alternately access system memory (not illustrated) via the memory channels 258. The general-purpose hashing function block 254 can define a default interleaving sequence for the memory requests to alternately access the memory channels 258. The hashing-function selection block 260 is operable to identifying the requesting functional unit 252 from the multiple functional units (e.g., IP cores) originating the memory request. The hashing-function selection block 260 selects one of the specific-purpose hashing functions 270, 272 in view of the identified functional unit 252. For example, if the requesting functional unit 252 is an IP core that has been identified as consumes high bandwidth and that disrupts the general case of homogenous requesting patterns (i.e., general-purpose hashing function block 254), the hashing-function selection block 260 can select the specific-purpose hashing function A 270 that is programmed for high bandwidth consumption memory requests. The specific-purpose hashing function 270 is programmed for specific types of access patterns that are typical of the requesting functional unit 252. However, if the requesting function is not assigned (or otherwise associated with) a specific-purpose hashing function block, the hashing-function selection block 260 can select the general-purpose hashing function 254. It should be noted that there may be multiple functional units that are assigned to the specific-purpose hashing function 270. Similarly, one or more additional functional units may be assigned to the specific-purpose hashing function 272. In further embodiments, the DHHM 207 can include more than two specific-purpose hashing functions. Also, the depicted embodiment illustrates two memory channels 258. In other embodiments, more than two memory channels 258 may be used.

In one embodiment, the specific-purpose hashing functions 270, 272 are fixed hashing functions. In another embodiment, the specific-purpose hashing functions 270, 272 are programmable. In one embodiment, the specific-purpose hashing functions 270, 272 are programmed via configurations registers 280, 282, respectively. These configuration registers 280, 282 may be part of the register file 106 described above with respect to FIG. 1. Alternatively, these registers are stored in the MCU 105 of FIG. 1. Alternatively, these parameters that define the specific-purpose hashing functions can be stored as part of a memory protection table or the like.

In one embodiment, the specific-purpose hashing function 270 performs a first hashing function, the specific-purpose hashing function 272 performs a second hashing function, and the general-purpose hashing function 254 performs a third hashing function. For example, the third hashing function is Bit6 XOR Bit13 XOR Bit 19. This hashing function can operate to alternate memory accesses to the memory channels for the general memory requests. The first hashing function may be Bit6 XOR Bit9 XOR Bit13 XOR Bit19, which is special case to alternate memory accesses according to a pattern that is more suitable for some types of requesting functional units. The second hashing function may be Bit6 XOR Bit9 XOR Bit10 XOR Bit13 XOR Bit19. Alternatively, other types of hashing functions may be used for different requesting patterns by one or more specific requesting functional units (e.g., ISOCx IPs in a system).

In the depicted embodiment, the hashing-function selection block 260 includes a memory address range comparator 262 and a multiplexer 264 (MUX). The memory address range comparator 262 receives a memory address of the current memory request from the requesting functional unit 252. The memory address range comparator 262 uses the memory address to identify the requesting functional unit 252. The multiplexer 264 receives outputs from the specific-purpose hashing function blocks 270, 272 and the general-purpose hashing function block 254 as inputs to the multiplexer 262. An output of the memory address range comparator 262 is configured to control the multiplexer 264 to output one of the inputs in view of the memory address of the current memory request. That is, if the memory address range comparator 262 determines that the memory request corresponds to a requesting functional unit that has been assigned a private memory region that corresponds to one of the specific-purpose hashing function 270, the multiplexer 264 selects the input from the specific-purpose hashing function 270 to be output from the DHHM 207. The output of the DHHM 207 can be routed to other memory controller blocks 256 and ultimately to the memory channels 258. The other memory controller blocks 256 may include write data buffers, write pending queues, read pending queues, a global scheduler, read return data paths, page tables or the like. Additional details of these blocks have not been included so as to not obscure the present embodiments.

In another embodiment, during the system initializing, an operating system configures which functional blocks (e.g., ISOC IPs), whose transactions are to be processed by a specific-purpose hash function (ISO devices), to request transactions to a private memory region. A requesting unit could be configured to still utilize the general-purpose hashing function for general transactions by bypassing the specific-purpose hashing functions. Alternatively, the operating system can configure the DHHM 207 to use the general-purpose hashing function when the functional units (e.g., ISOCx IPs) with special hashing functions are not in use, thus not reducing the total memory available. The operating system can optionally choose to relocate the data utilizing that memory region when these functional units with special hashing functions will be in use. For example, an IP core for a camera may be an ISOC IP that is not permanently enabled, and that only consumes resources upon its utilization. This IP core can be assigned to be processed by the specific-purpose hashing function 270. In a further embodiment, the private hashing functions are also configured during the system's initialization phase.

After an ISOCx memory requests arrives to the memory system, as illustrated as the requesting functional unit 252, the memory request's address is compared against the ISOCx memory private ranges assigned to the specific-purpose hashing functions block 270, 272. Simultaneously or concurrently, this address can be passed through the general-purpose hashing function block 254 and the specific-purpose hashing function blocks 270, 272. The output of the memory address range comparator 262 is used to select which hashing function result is fed to the remaining blocks 256 of the memory controller. The other MC blocks 256, using the output of the selected hashing function routes the request to the appropriate memory channel 258. Then when no ISOCx IP is enabled, the results from the general-purpose hashing function 254 are propagated to the other block s256 of the memory controller.

Given that the DHHM 207 is in a critical latency path, considerations can be taken in the implementation of the memory address comparator 262, the specific-purpose hashing function blocks 270, 272, and the multiplexer 264. That is, the memory address range comparator 262 should be as fast as possible. To avoid obtaining a slow, multi-layered circuit, every memory range to be compared can be done with an independent comparator and thus, the output of this unit could be a one-hot number. To improve the speed of the multiplexor 264, a design using passing gates could be used. For example, the passing gates may be implemented in CMOS. Alternatively, other technologies can be used to implement the memory address range comparator 262 and multiplexer 264. Using programmable specific-purpose hashing functions may provide an advantage of being able to change the hashing configuration late in the product's design phase or in its production phase. However, a poorly designed programmable hashing function could introduce high latencies in an already latency sensitive path. In one embodiment, passing gate XORs can be used for the specific-purpose hashing blocks 270, 272. It should be noted that special care should be taken to avoid logic corruptions due to voltage drops while sequentially connecting these blocks to a multiplexer 264 with passing gates. In another embodiment, the logic design of the multiplexer 264 and the programmable specific-purpose hashing blocks 270, 272 can be merged. The latency added by the DHHM 207 is the time that it takes for an address to be compared plus the time it takes for a request to be propagated through the output multiplexer 264.

As described herein, multiple hashing functions can be used for the general-purpose hashing function blocks 254 and the specific-purpose hashing function blocks 270, 272. An example of a general purpose hashing function: First Hashing=Bit6 XOR Bit13 XOR Bit19, and graphic traces from specific requesting functional units can use the following specific-purpose hashing function: Second Hashing=Bit6 XOR Bit9 XOR Bit13 XOR Bit19. The second hashing can use the memory channels to the system memory more efficiently for graphic traces. In some cases, graphic traces sequentially request memory at a 4K block granularity that can be effectively hashed by the same bits as the general-purpose hashing function (First Hashing). However, these graphic traces can exhibit "jumps" in the requests' addresses due to switching between frames that were simultaneously processed. The effect of these jumps can be effectively handled by Bits 9 and 10, thus completing the hashing function shown in Second Hashing above. In another embodiment, the first hashing can be used for general memory requests, and memory requests from a camera functional block can use the following specific-purpose hashing function: Third Hashing=Bit6 XOR Bit9 XOR Bit10 XOR Bit13 XOR Bit19. These examples are based on memory requests that are 64 bits. Alternatively, other hashing functions can be used. In particular, the hashing functions may vary based on the length of the memory addresses being used.

These embodiments may provide various advantages, especially to SoC systems or to client microprocessor systems. For example, the embodiments may select a hashing function more tailored to the characteristics of the particular functional unit's request (e.g., ISOCx IPs requests) to balance the channels utilization of the memory system. Therefore, the selected hashing function for those functional units can provide lower average latencies and higher average bandwidths. An improvement in the ISOCx performance may also be observed from a better utilization of the memory system. Furthermore, a programmable hashing function allows later changes in the behavior of the memory system. Firmware changes in the ISOCx IPs can cause less impact of the memory system. Firmware changes in the ISOCx IPs can cause less impact to the overall performance of the memory system if they can be matched by changed in the memory system.

In a further embodiment, the DHHM 207 includes a bypass block 290 that bypasses the multiplexer 264 and routes the output of the general-purpose hashing function block 254 to the other blocks 256 of the memory controller when the bypass block 290 is enabled.

Figure 3A:
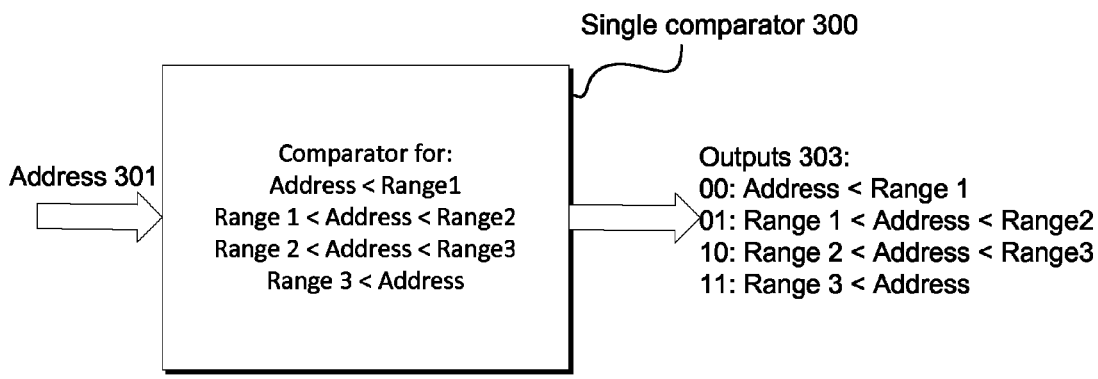
FIG. 3A is a block diagram of a single comparator for the hashing-function selection block according to one embodiment.

FIG. 3A is a block diagram of a single comparator 300 for the hashing-function selection block according to one embodiment. The single comparator 300 receives the address 301 of a current memory request and outputs a value 303 based on the range in which the address 301 falls. For example, if the address is in a first range (Address<Range 1), a first value, 00, is output from the comparator 300. If the address is in a second range (Range 1<Address<Range 2), a second value, 01, is output from the comparator 300. If the address is in a third range (Range 2<Address<Range 3), a third value, 10, is output from the comparator 300. If the address is in a fourth range (Range 3<Address), a fourth value, 11, is output from the comparator 300. In further embodiments, the comparator 300 can be configured to compare the address 301 against more or less ranges than four ranges.

Figure 3B:
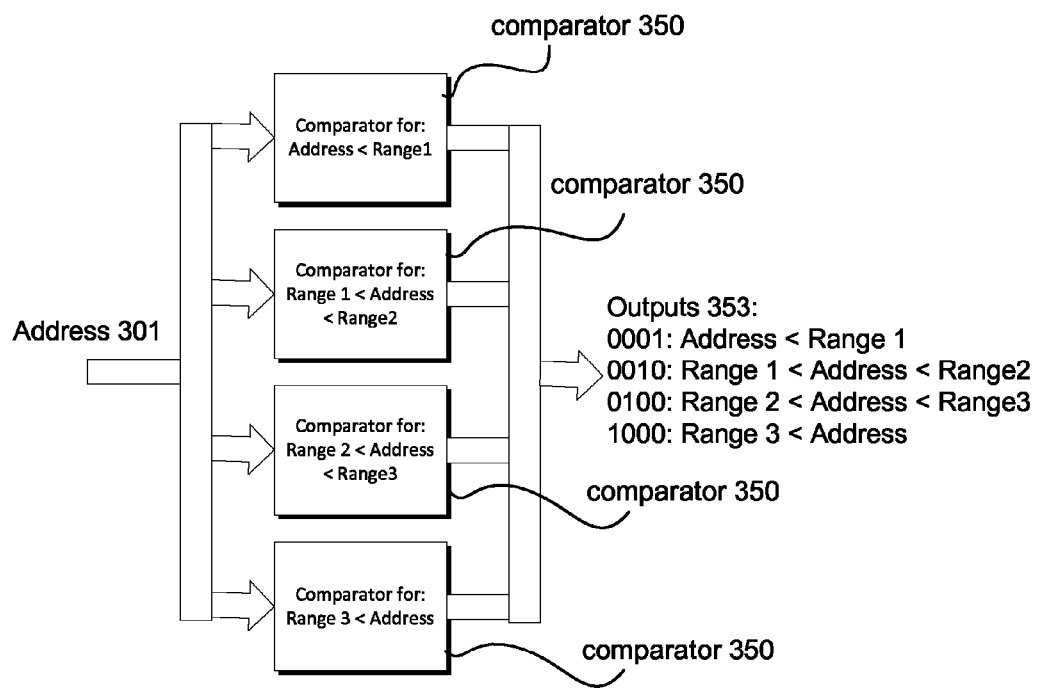
FIG. 3B is a block diagram of multiple comparators for the hashing-function selection block according to another embodiment.

FIG. 3B is a block diagram of multiple comparators 350 for the hashing-function selection block according to another embodiment. The address 301 is input into the four comparators 350. The first comparator 350 is configured to determine if the address 301 is in a first range (Address<Range1), the second comparator 350 is configured to determine if the address 301 is in a second range (Range 1<Address<Range2), the third comparator 350 is configured to determine if the address 301 is in a third range (Range 2<Address<Range3), and the fourth comparator 350 is configured to determine if the address 301 is in a fourth range (Range 3<Address). Each comparator 350 outputs a single bit that can be used as part of the output value 353. For example, when the address 301 is in the first range, a first value, 0001, is output; when the address 301 is in the second range, a second value, 0010, is output; when the address 301 is in the third range, a third value, 0100, is output; and when the address 301 is in the fourth range, a fourth value, 1000, is output.

Figure 4:
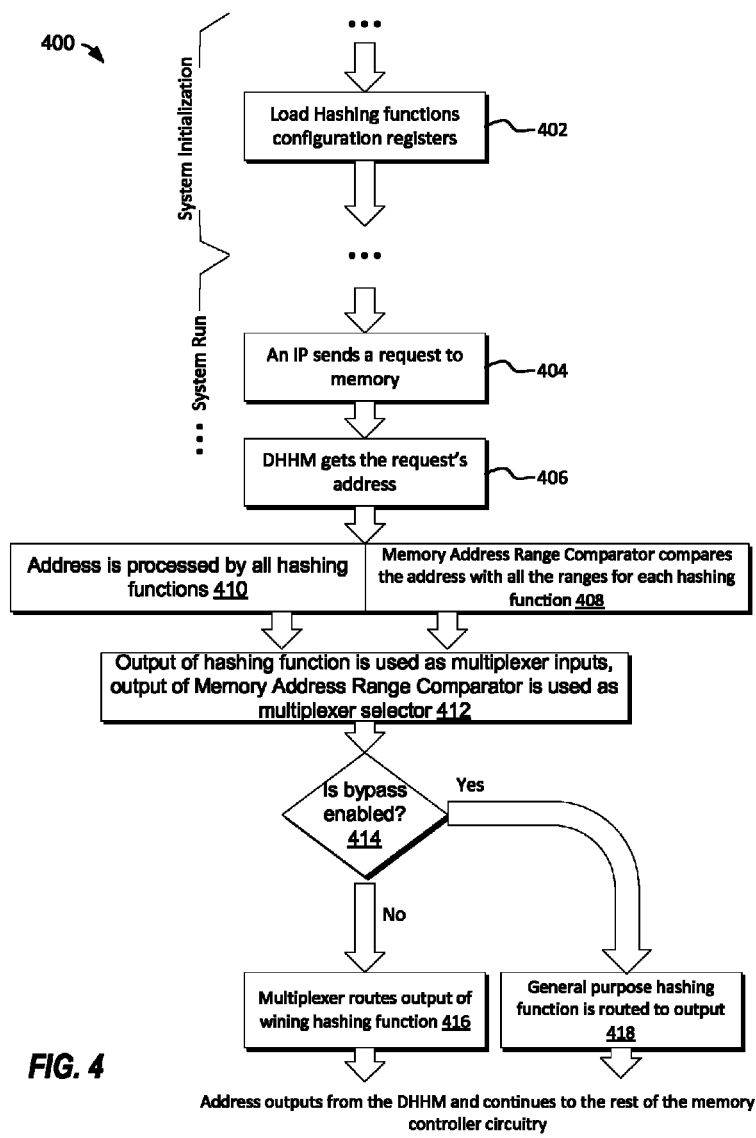
FIG. 4 is a flow diagram of a DHHM for dynamic heterogeneous hashing according to one embodiment.

FIG. 4 is a flow diagram of a DHHM 400 for dynamic heterogeneous hashing according to one embodiment. On system initialization, the hashing functions configuration registers are loaded with their values (block 402). On system run, a requesting IP core sends a request to memory (block 404). The DHHM 400 obtains the memory address from the request (block 406). In parallel, a memory address range comparator compares the address with all the ranges for each hashing function and gives output to multiplexer (block 408) and the address is processed by all hashing functions (block 410). The multiplexer routes the output of the winning hashing function. If bypassing is enabled (block 414), the general-purpose hashing function is routed to the output (block 418); otherwise, the multiplexer routes output of the winning hashing function (block 416). The address is output from the DHHM 400 and continues to the rest of the memory controller circuitry.

Figure 5:
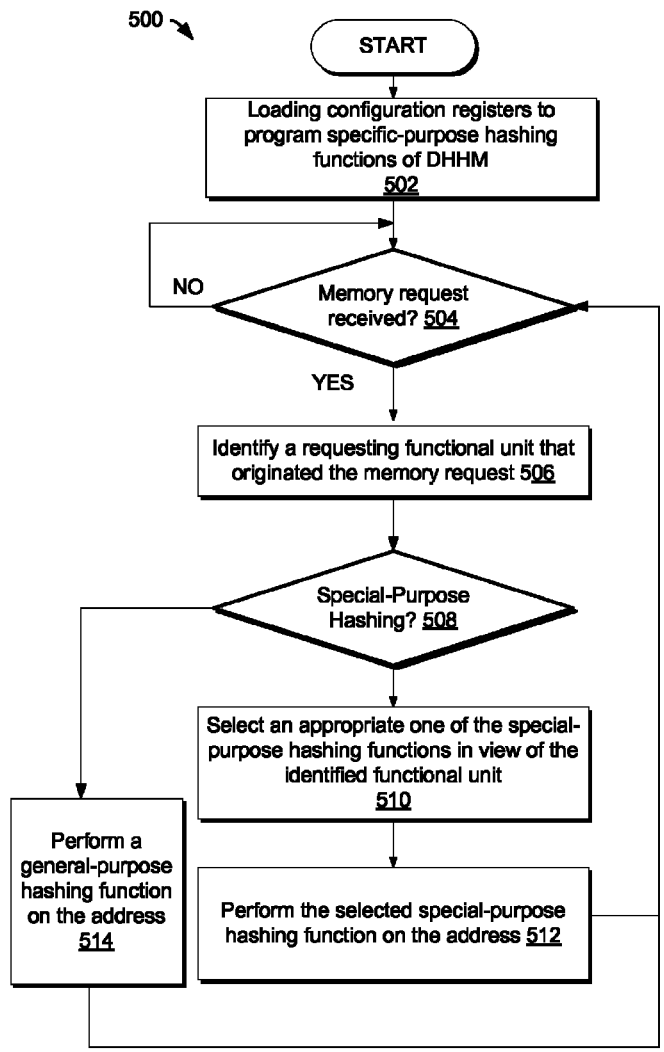
FIG. 5 is a flow diagram of a method of dynamic heterogeneous hashing according to another embodiment.

FIG. 5 is a flow diagram of a method 500 of dynamic heterogeneous hashing according to another embodiment. Method 500 may be performed by processing logic that may comprise hardware (e.g., circuitry, dedicated logic, programmable logic, microcode, etc.), software (such as operations being performed by the MCU), firmware or a combination thereof. In one embodiment, method 500 is performed by MCU 105 of FIG. 1. In another embodiment, the method 500 is performed by the DHHM 107 of FIG. 1 or DHHM 207 of FIG. 2. In another embodiment, the method 500 is performed by the DHHM 400 of FIG. 4. Alternatively, other components of the computing system 100 may perform some or all of the operations of the method 500.

Referring to FIG. 5, the method 500 begins by the processing logic with loading configuration registers to program multiple specific-purpose hashing functions of a dynamic heterogeneous hashing module (DHHM) of a MCU (block 502). The specific-purpose hashing function define different interleaving sequences for memory requests to alternately access multiple memory channels. The processing logic determines if a memory request is received (block 504). When the processing logic receives a current memory request at block 504, the processing logic identifies a requesting functional unit that originated the memory request (block 506). The processing logic determines if the requesting functional unit requires specific-purpose hashing (block 508). If so, the processing logic selects an appropriate one of the specific-purpose hashing functions in view of the identified functional unit (block 510), and the processing logic performs the selected hashing function on the address (block 512), and returns to block 504. However, if the processing logic determines that no specific-purpose hashing is required, the processing logic performs a general-purpose hashing function on the address (block 514), and returns to block 504.

In a further embodiment, the physical memory of the system memory is organized into memory regions, where each of the memory regions correspond to one of the hashing functions. In one embodiment, the processing logic obtains a memory address of the current memory request and compares the memory address against memory ranges corresponding to the specific-purpose hashing functions, and optionally that of general-purpose hashing function. The processing logic selects one of the specific-purpose hashing functions or the general-purpose hashing function for the current memory request by selecting a winning hashing function in view of the comparison. In a further embodiment, the processing logic performs the specific-purpose hashing function on the memory address of the memory request in parallel, along with the general-purpose hashing function. The processing logic outputs results to a multiplexer. The processing logic compares the memory address with memory ranges and selects one of the inputs of the multiplexer to be routed to the output of the multiplexer as controlled by the result of the comparison.

In another embodiment, the processing logic bypasses the multiplexer when a bypass block of the DHHM is enabled.

In one embodiment, the processing logic performs the general-purpose hashing functions and performs the specific-purpose hashing functions, such as the hashing functions described herein.

Figure 6:
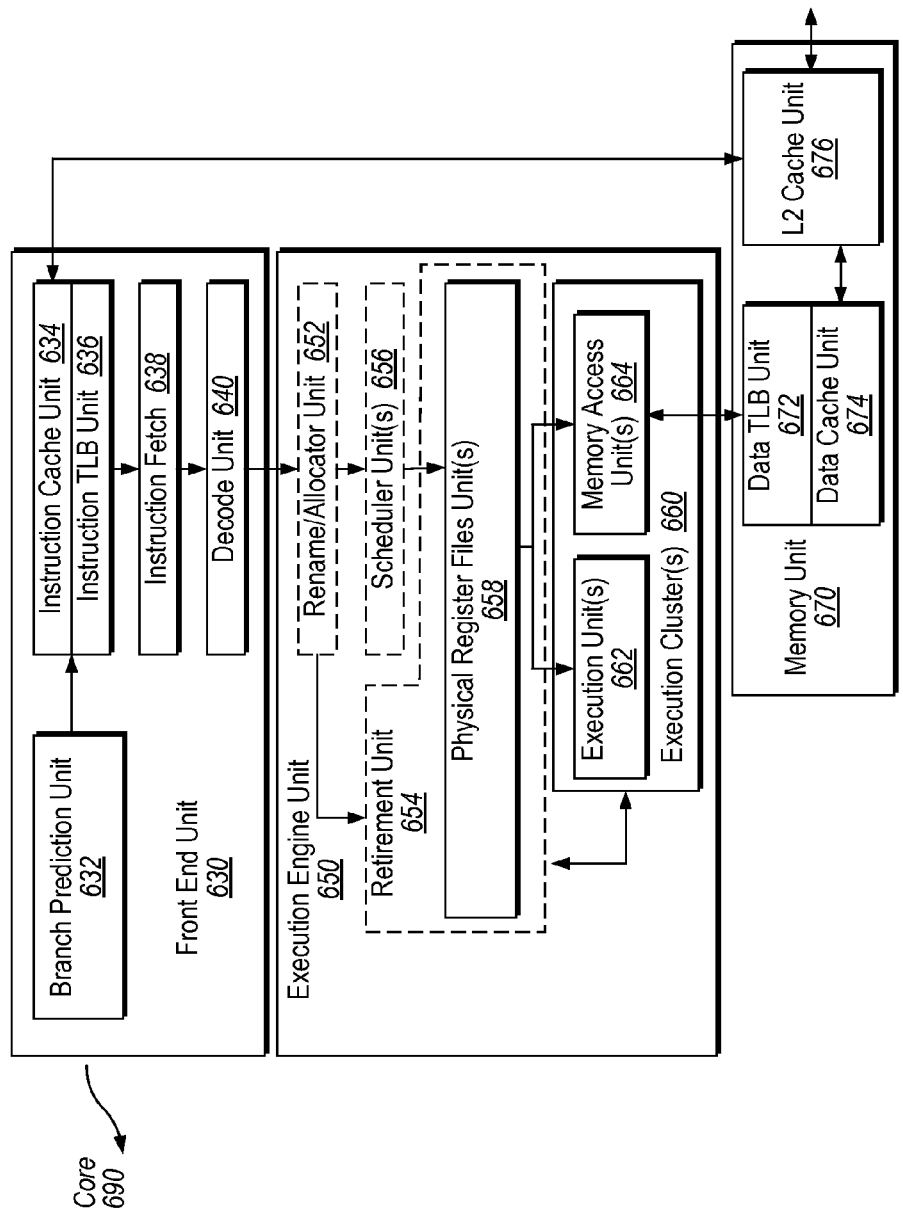
FIG. 6A is a block diagram illustrating an in-order pipeline and a register renaming stage, out-of-order issue/execution pipeline according to one embodiment.
FIG. 6B is a block diagram illustrating a micro-architecture for a processor that implements dynamic heterogeneous hashing according to one embodiment.

FIG. 6A is a block diagram illustrating a micro-architecture for a processor 600 that implements dynamic heterogeneous hashing according to one embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
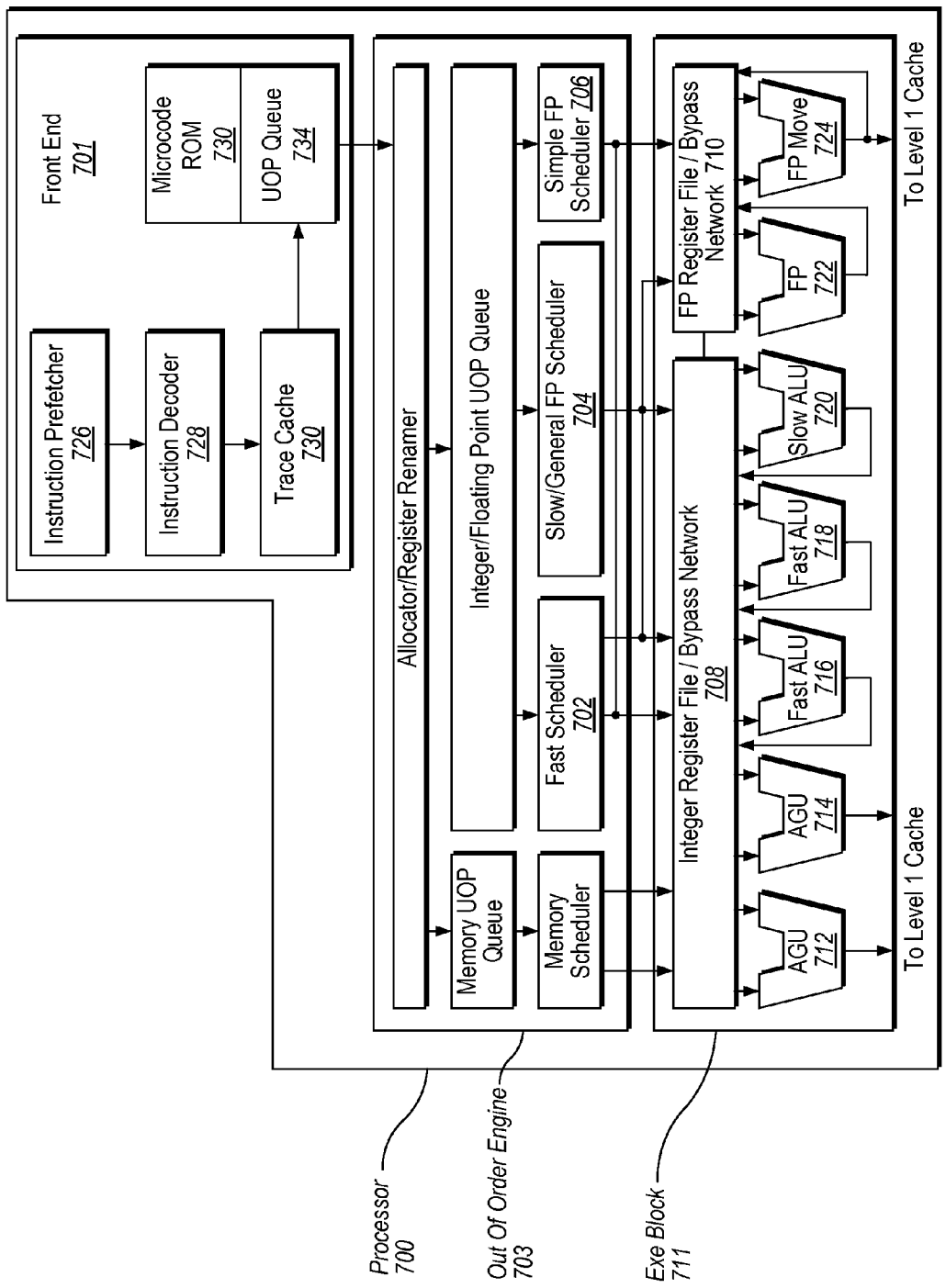
FIG. 7 illustrates a block diagram of the micro-architecture for a processor that includes logic circuits to perform dynamic heterogeneous hashing according to one embodiment.

FIG. 7 illustrates a block diagram of the micro-architecture for a processor 700 that includes logic circuits to perform dynamic heterogeneous hashing according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement dynamic heterogeneous hashing according to one embodiment. In one embodiment, the execution block 711 of processor 700 may include MCU 115, to perform dynamic heterogeneous hashing according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
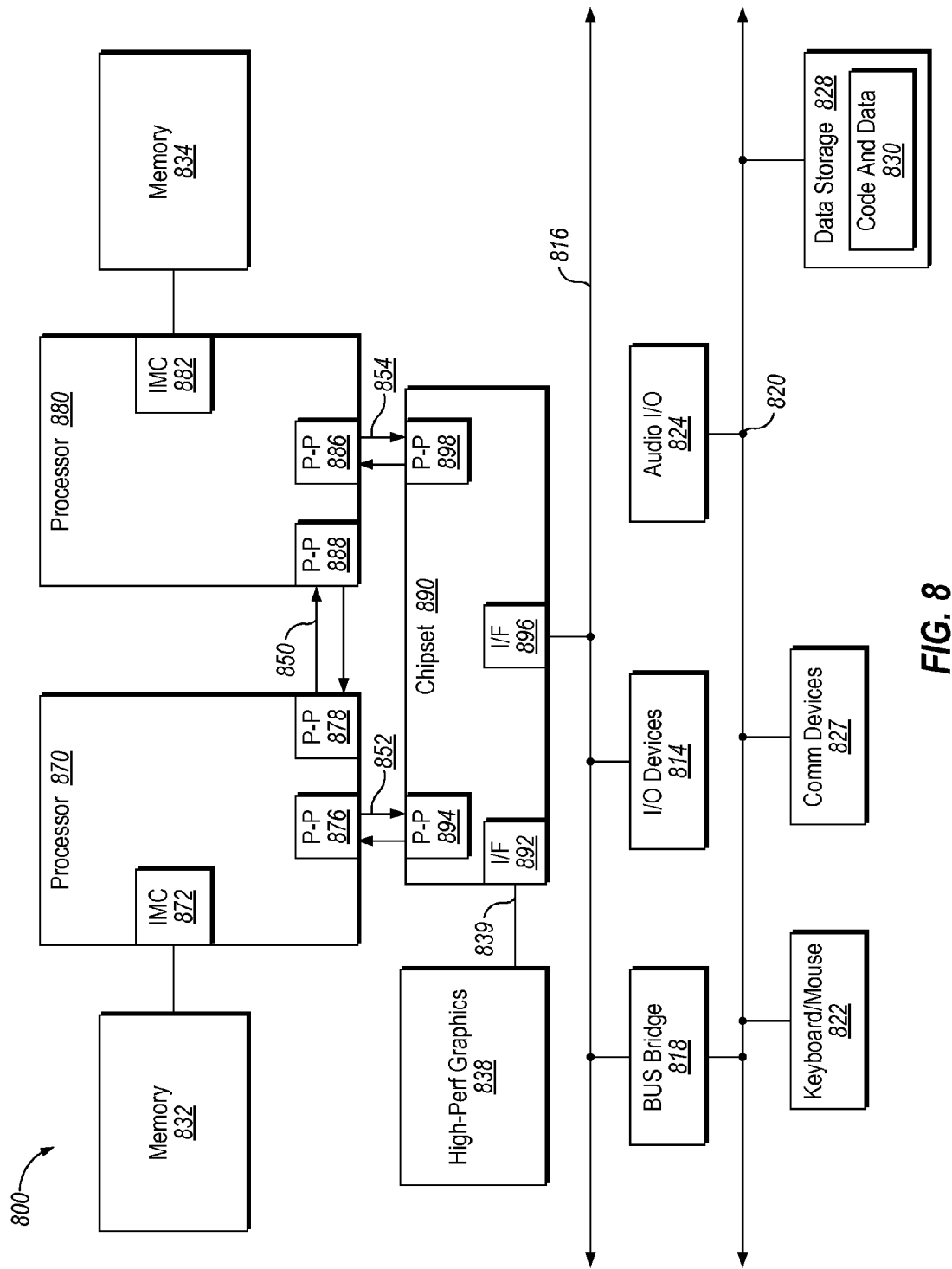
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
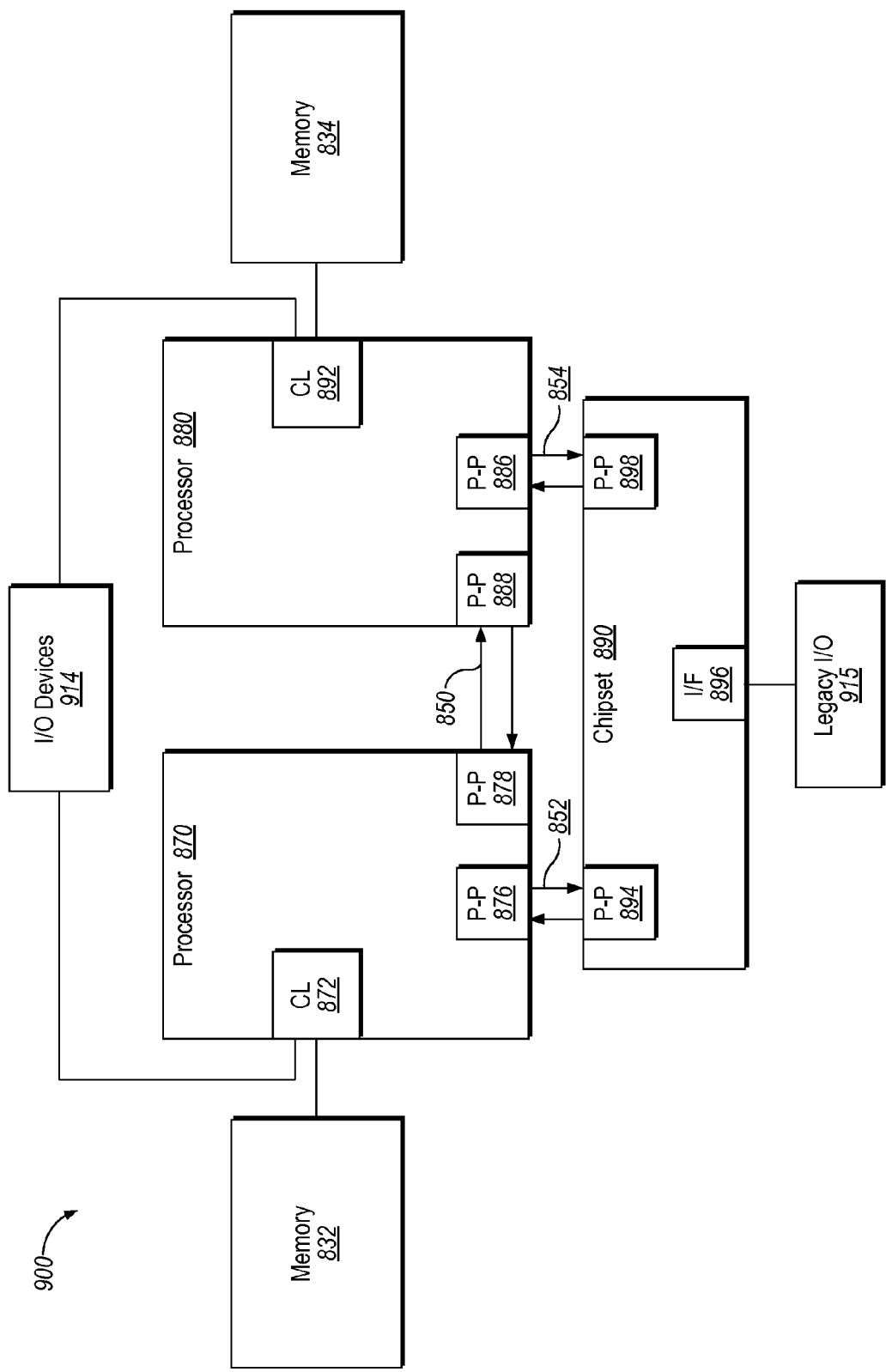
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition, CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990.

Figure 10:
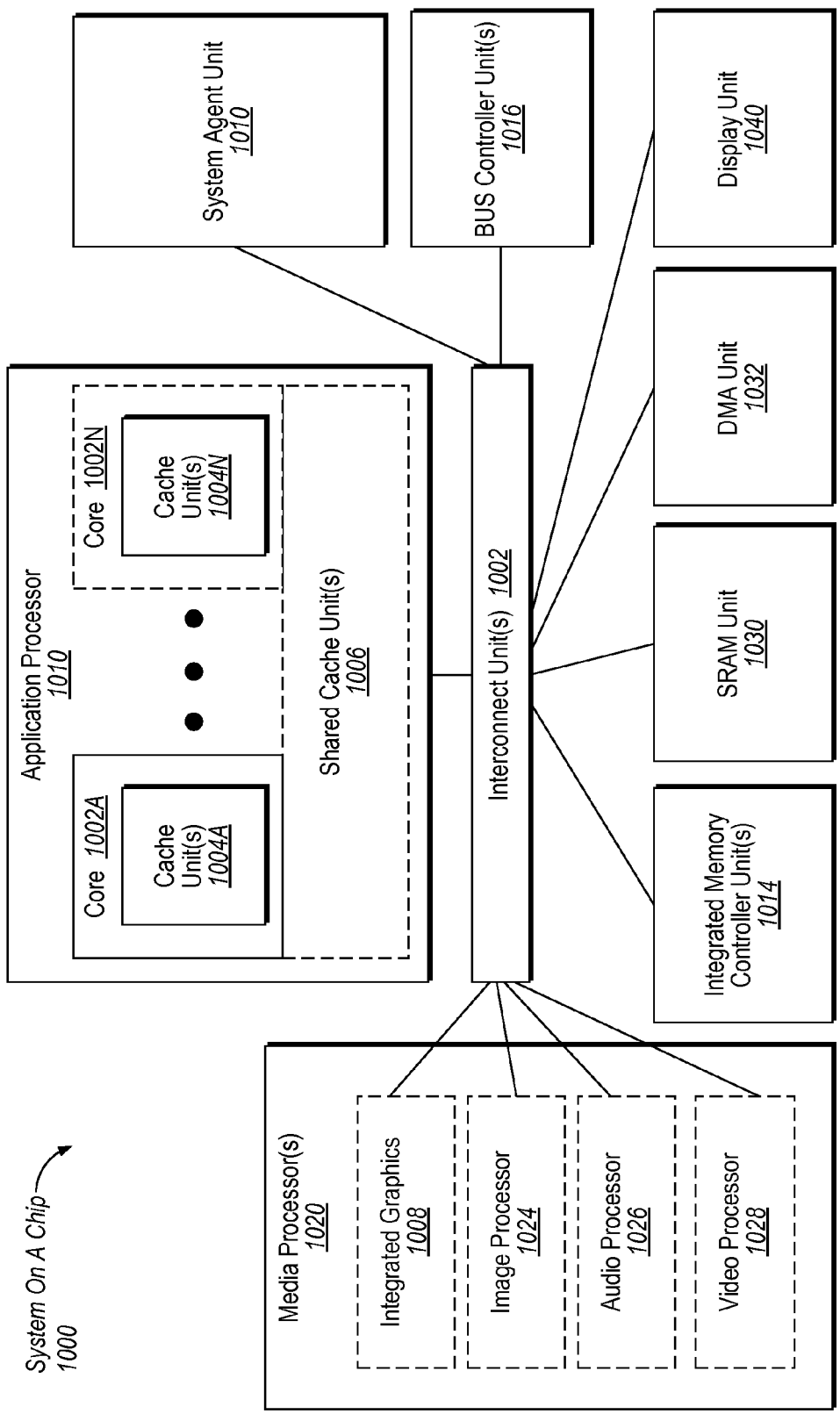
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
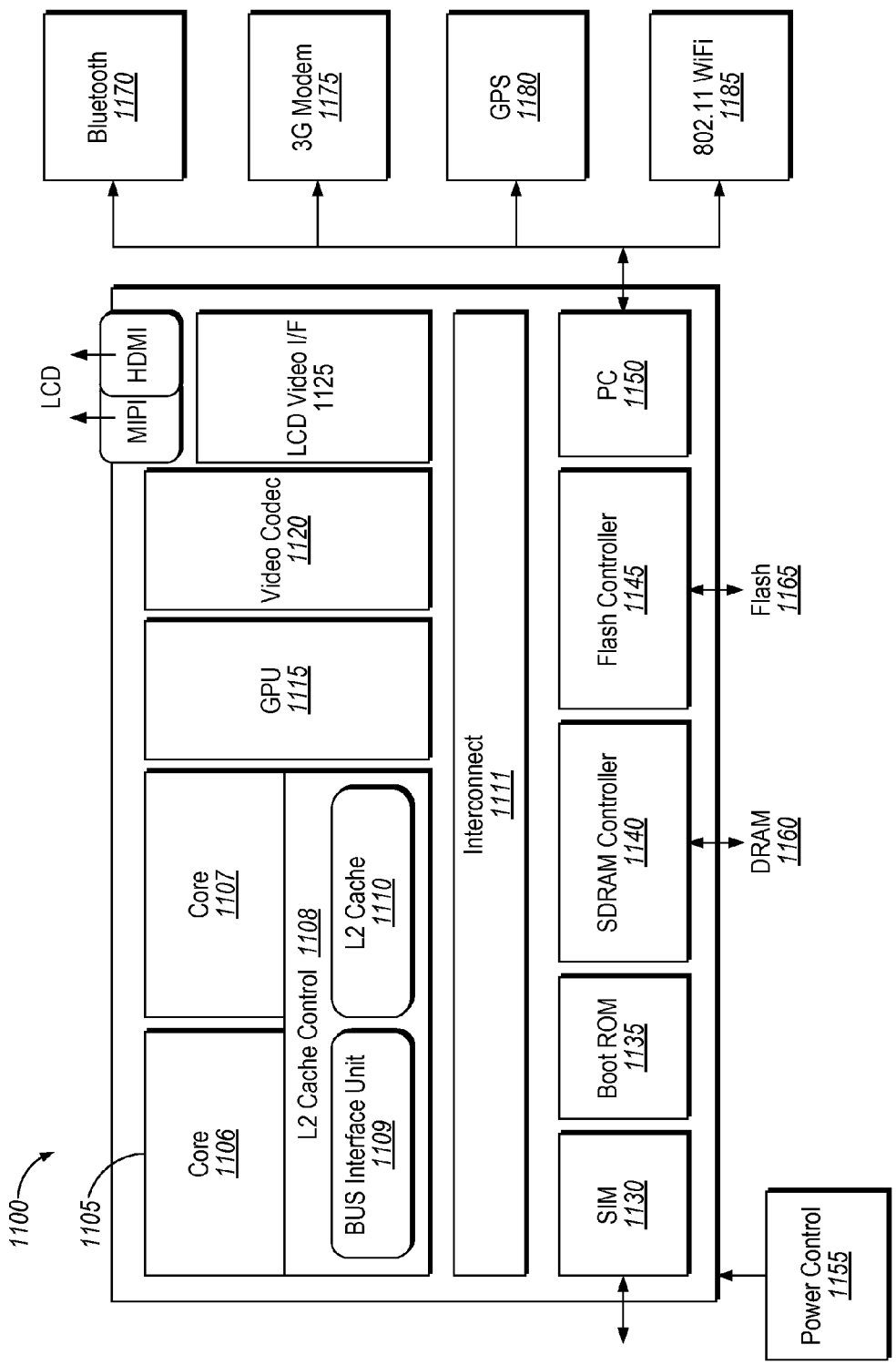
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
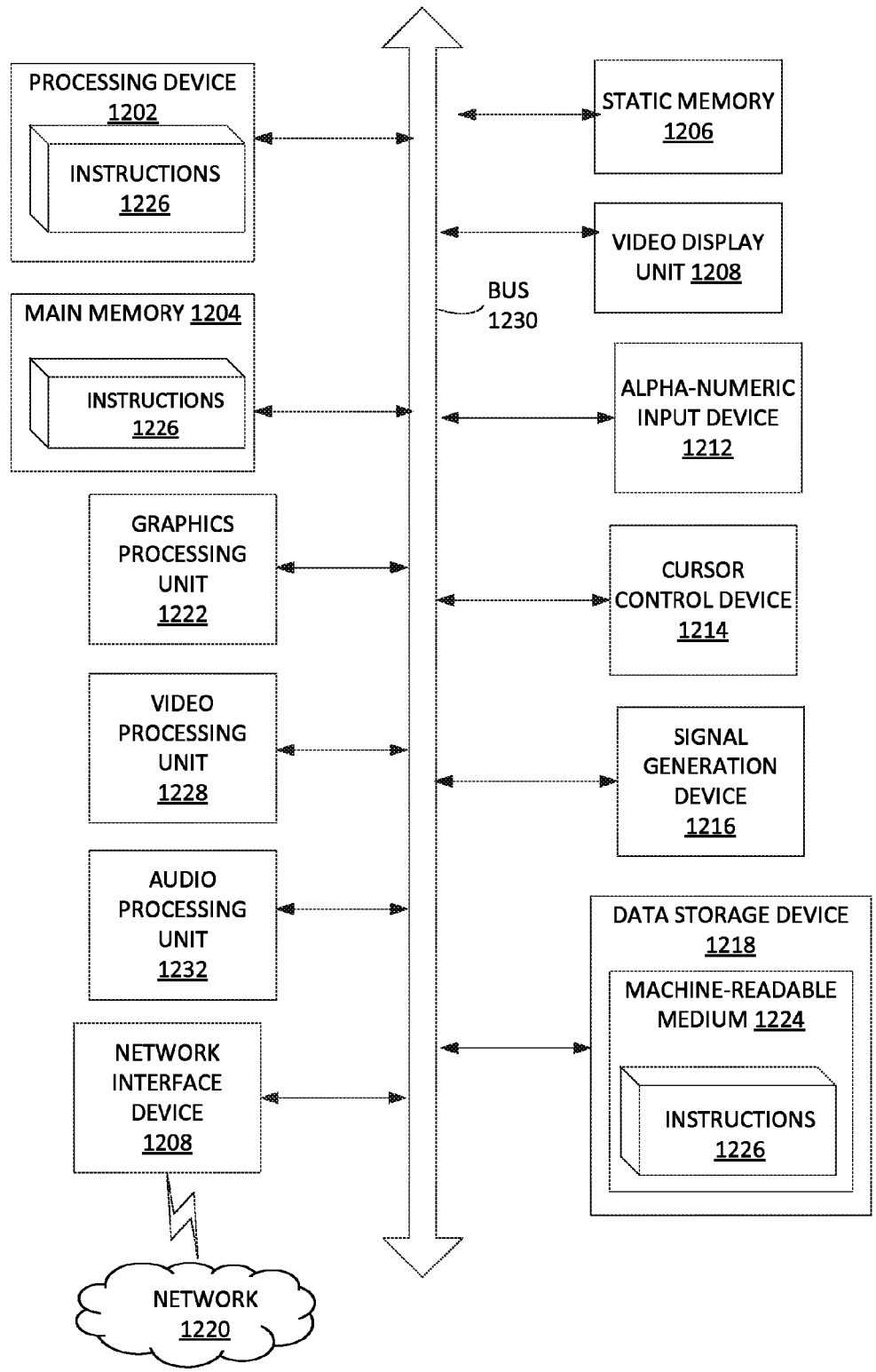
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a plurality of functional units; 2) a plurality of memory channels coupled to a system memory; and 3) a memory controller unit (MCU) coupled to the plurality of functional units and the plurality of memory channels, where the MCU comprises a dynamic heterogeneous hashing module (DHHM) comprising: a) a plurality of specific-purpose hashing function blocks that define different interleaving sequences for memory requests to alternately access the plurality of memory channels; and b) a hashing-function selection block, wherein the hashing-function selection block is operable to identify a requesting functional unit from the plurality of functional units originating a current memory request and to select one of the plurality of specific-purpose hashing function blocks for the current memory request in view of the requesting functional unit.

In Example 2, the DHHM of Example 1 comprises a general-purpose hashing function block that defines a default interleaving sequence for the memory requests to alternately access the plurality of memory channels, and wherein the hashing-function selection block is operable to select one of the plurality of specific-purpose hashing function blocks or general-purpose hashing function block for the current memory request in view of the requesting functional unit.

In Example 3, in the processor of any one of Examples 1-2, the general-purpose hashing function block is to perform a first hashing function and a first hashing function block of the plurality of special-purpose hashing function blocks is to perform a second hashing function, wherein the first hashing function is Bit6 XOR Bit13 XOR Bit 19, and wherein the second hashing function is Bit6 XOR Bit9 XOR Bit13 XOR Bit19.

In Example 4, in the processor of any one of Examples 1-3, the general-purpose hashing function block is to perform a first hashing function and a first hashing function block of the plurality of special-purpose hashing function blocks is to perform a second hashing function, wherein the first hashing function is Bit6 XOR Bit13 XOR Bit 19, and wherein the second hashing function is Bit6 XOR Bit9 XOR Bit10 XOR Bit13 XOR Bit19.

In Example 5, the hashing-function selection block of any one of Examples 1-4, comprises: a) a memory address range comparator to receive a memory address of the current memory request to identify the requesting functional unit; and b) a multiplexer coupled to the memory address range comparator and to receive outputs from the plurality of specific-purpose hashing function blocks and the general-purpose hashing function block as inputs to the multiplexer, wherein an output of the memory address range comparator is configured to control the multiplexer to output one of the inputs in view of the memory address of the current memory request.

In Example 6, the memory address range comparator of any of Examples 1-5, comprises a single comparator to compare the memory address against a plurality of address ranges.

In Example 7, the memory address range comparator of any of Examples 1-6, comprises a plurality of comparators, wherein each of the plurality of comparators is configured to compare the memory address against a single range.

In Example 8, in any of Examples 1-7, comprises a bypass block operable to bypass the multiplexer.

In Example 9, in the processor of any of Examples 1-8, the plurality of specific-purpose hashing function blocks are programmable.

In Example 10, the DHHM of any of Examples 1-9, comprises a plurality of configuration registers to program the plurality of specific-purpose hashing function blocks respectively.

In Example 11, in the processor of any of Examples 1-10, memory space of the system memory is segmented into a plurality of regions and wherein the plurality of specific-purpose hashing function blocks correspond to one of the plurality of regions of the system memory.

Various embodiments may have different combinations of the structural features described above. For instance, all optional features of the computing system described above may also be implemented with respect to the method or process described herein and specifics in the examples may be used anywhere in one or more embodiments.

In example 12, a method comprises 1) loading a plurality of values in configuration registers to program a plurality of specific-purpose hashing functions of a dynamic heterogeneous hashing module (DHHM) of a memory controller unit (MCU) of a processor; 2) receiving, by the DHHM, a current memory request to access system memory coupled to the processor via a plurality of memory channels, wherein the plurality of specific-purpose hashing function define different interleaving sequences for memory requests to alternately access the plurality of memory channels; 3) identifying, by the DHHM, a requesting functional unit from a plurality of functional units of the processor that originated the current memory request; and 4) selecting, by the DHHM, one of the plurality of specific-purpose hashing function for the current memory request in view of the requesting functional unit.

In Example 13, the method of Example 12 further comprises selecting, by the DHHM, a general-purpose hashing function for the current memory request in view of the requesting functional unit, wherein the general-purpose hashing function defines a default interleaving sequence for the memory requests to alternately access the plurality of memory channels.

In Example 14, the method of any of Examples 12-13 further comprises: a) obtaining, by the DHHM, a memory address of the current memory request; and b) comparing, by the DHHM, the memory address against memory ranges corresponding to the plurality of special-purpose hashing functions and general-purpose hashing function, and wherein the selecting the one of the plurality of specific-purpose hashing functions for the current memory request comprising selecting a winning hashing function in view of the comparison.

In Example 15, the method of any of Examples 12-14 further comprises: a) performing the plurality of specific-purpose hashing functions on the memory address of the memory request; b) performing the general-purpose hashing function on the memory address of the memory request; c) outputting results of the plurality of specific-purpose hashing functions and general-purpose hashing function as inputs to a multiplexer of the DHHM; d) comparing, by a comparator of the DHHM, the memory address with memory ranges corresponding to the plurality of special-purpose hashing functions and general-purpose hashing function; and e) selecting, by the multiplexer, one of the inputs in view of the comparison.

In Example 16, the method of any of Examples 12-15 further comprises bypassing the multiplexer when a bypass block of the DHHM is enabled.

In Example 17, the method of any of Examples 12-16 further comprises organizing, by the MCU, physical memory into a plurality of memory regions, each of the plurality of memory regions corresponding to one of the plurality of special-purpose hashing functions.

In Example 18, in the method of any of Examples 12-17, the general-purpose hashing function is Bit6 XOR Bit13 XOR Bit 19, and wherein one of the plurality of special-purpose hashing functions is Bit6 XOR Bit9 XOR Bit13 XOR Bit19.

In Example 19, in the method of any of Examples 12-18, the general-purpose hashing function is Bit6 XOR Bit13 XOR Bit 19, and wherein one of the plurality of special-purpose hashing functions is Bit6 XOR Bit9 XOR Bit10 XOR Bit13 XOR Bit19.

Various embodiments may have different combinations of the structural features described above. For instance, all optional features of the processors and methods described above may also be implemented with respect to a processor described herein and specifics in the examples may be used anywhere in one or more embodiments.

Example 20 is an integrated circuit processor comprising 1) a processor core; 2) a memory device operable to store code memory and data memory; and 3) a memory controller unit (MCU) coupled between the processor core and the memory device, wherein the MCU is configured to: a) load a plurality of values in configuration registers to program a plurality of specific-purpose hashing functions of a dynamic heterogeneous hashing module (DHHM); b) receive a current memory request to access the memory device via a plurality of memory channels, wherein the plurality of specific-purpose hashing function define different interleaving sequences for memory requests to alternately access the plurality of memory channels; 3) identify a requesting functional unit from a plurality of functional units of the processor that originated the current memory request; and 4) select one of the plurality of specific-purpose hashing function for the current memory request in view of the requesting functional unit.

In Example 21, the DHHM of Example 20 comprises: a) a memory address range comparator to receive a memory address of the current memory request to identify the requesting functional unit; and b) a multiplexer coupled to the memory address range comparator and to receive outputs from the plurality of specific-purpose hashing function and the general-purpose hashing function as inputs to the multiplexer, wherein an output of the memory address range comparator is configured to control the multiplexer to output one of the inputs in view of the memory address of the current memory request.

In Example 22, in the integrated circuit of any of Examples 20-21, the memory address range comparator comprises a plurality of comparators, wherein each of the plurality of comparators is configured to compare the memory address against a single range.

In Example 23, in the integrated circuit of any of Examples 20-22 the DHHM further comprises a plurality of configuration registers to program the plurality of specific-purpose hashing functions.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 26 is a non-transitory, computer-readable storage medium including instructions that, when executed by a processor, cause the processor to perform the method of Examples 12-20.

Example 24 is a system comprising a system on chip (SOC) comprising a plurality of functional units and a memory controller unit (MCU) coupled to the plurality of functional units, wherein the comprises a dynamic heterogeneous hashing module comprising: 1) a plurality of specific-purpose hashing function blocks that define different interleaving sequences for memory requests to alternately access a plurality of memory channels; and 2) a hashing-function selection block, wherein the hashing-function selection block is operable to identify a requesting functional unit from the plurality of functional units originating a current memory request and to select one of the plurality of specific-purpose hashing function blocks for the current memory request in view of the requesting functional unit.

In Example 25, the SOC of Example 24 further comprises the subject matter of Examples 2-11.

In Example 26, the SOC of Example 24 is further configured to perform the subject matter of Examples 12-19.

Example 27 is an apparatus comprising: 1) a plurality of functional units of a processor; 2) means for loading a plurality of values in configuration registers to program a plurality of specific-purpose hashing functions; 3) means for receiving a current memory request to access system memory coupled to the processor via a plurality of memory channels, wherein the plurality of specific-purpose hashing function define different interleaving sequences for memory requests to alternately access the plurality of memory channels; 4) means for identifying a requesting functional unit from a plurality of functional units of the processor that originated the current memory request; and 5) means for selecting one of the plurality of specific-purpose hashing function for the current memory request in view of the requesting functional unit.

In Example 28, the apparatus of Example 27 further comprises subject matter of Examples 1-11 and 20-26.

Example 29 is a system comprising: a memory device and a processor comprising an execution-aware memory controller unit (EA-MCU), wherein the processor is configured to perform the method of any of Examples 12-19.

In Example 30, the processor of Example 29 further comprises the subject matter of any of Examples 1-11 and 20-26.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to dynamic heterogeneous hashing in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a plurality of functional units;
   a plurality of memory channels coupled to a system memory; and
   a memory controller unit (MCU) coupled to the plurality of functional units and the plurality of memory channels, wherein the MCU comprises a dynamic heterogeneous hashing module (DHHM) comprising:
      a general-purpose hashing function block that defines a default interleaving sequence for memory requests to alternately access the plurality of memory channels;
      a plurality of specific-purpose hashing function blocks that define different interleaving sequences for the memory requests to alternately access the plurality of memory channels; and
      a hashing-function selection block to:
         receive a memory address of a current memory request to identify a requesting functional unit from the plurality of functional units originating the current memory request;
         receive outputs from the plurality of specific-purpose hashing function blocks and the general-purpose hashing function block as inputs;
         select one of the plurality of specific-purpose hashing function blocks or the general-purpose hashing function block for the current memory request in view of the requesting functional unit; and
         output one of the inputs in view of the selected one of the plurality of specific-purpose hashing function blocks or the general-purpose hashing function block.

2. The processor of claim 1, wherein the general-purpose hashing function block is to perform a first hashing function and a first hashing function block of the plurality of specific-purpose hashing function blocks is to perform a second hashing function, wherein the first hashing function is Bit6 XOR Bit13 XOR Bit 19, and wherein the second hashing function is Bit6 XOR Bit9 XOR Bit13 XOR Bit19.

3. The processor of claim 1, wherein the general-purpose hashing function block is to perform a first hashing function and a first hashing function block of the plurality of specific-purpose hashing function blocks is to perform a second hashing function, wherein the first hashing function is Bit6 XOR Bit13 XOR Bit 19, and wherein the second hashing function is Bit6 XOR Bit9 XOR Bit1 0 XOR Bit13 XOR Bit19.

4. The processor of claim 1, wherein the plurality of specific-purpose hashing function blocks are programmable.

5. The processor of claim 1, wherein the DHHM further comprises a plurality of configuration registers to program the plurality of specific-purpose hashing function blocks respectively.

6. The processor of claim 1, wherein memory space of the system memory is segmented into a plurality of regions and wherein the plurality of specific-purpose hashing function blocks correspond to one of the plurality of regions of the system memory.

7. The processor of claim 1, wherein the hashing-function selection block comprises:
   a memory address range comparator to receive the memory address of the current memory request to identify the requesting functional unit; and
   a multiplexer coupled to the memory address range comparator and to receive outputs from the plurality of specific-purpose hashing function blocks and the general-purpose hashing function block as the inputs to the multiplexer, wherein output of the memory address range comparator is to control the multiplexer to output the one of the inputs in view of the memory address of the current memory request.

8. A processor comprising:
a plurality of functional units;
a plurality of memory channels coupled to a system memory; and
a memory controller unit (MCU) coupled to the plurality of functional units and the plurality of memory channels, wherein the MCU comprises a dynamic heterogeneous hashing module (DHHM) comprising:
  a general-purpose hashing function block that defines a default interleaving sequence for memory requests to alternately access the plurality of memory channels;
  a plurality of specific-purpose hashing function blocks that define different interleaving sequences for the memory requests to alternately access the plurality of memory channels; and
  a hashing-function selection block operable to identify a requesting functional unit from the plurality of functional units originating a current memory request and to select one of the plurality of specific-purpose hashing function blocks or the general-purpose hashing function block for the current memory request in view of the requesting functional unit, wherein the hashing-function selection block comprises:
    a memory address range comparator to receive a memory address of the current memory request to identify the requesting functional unit; and
    a multiplexer coupled to the memory address range comparator and to receive outputs from the plurality of specific-purpose hashing function blocks and the general-purpose hashing function block as inputs to the multiplexer, wherein an output of the memory address range comparator is configured to control the multiplexer to output one of the inputs in view of the memory address of the current memory request.

9. The processor of claim 8, wherein the memory address range comparator comprises a single comparator to compare the memory address against a plurality of address ranges.

10. The processor of claim 8, wherein the memory address range comparator comprises a plurality of comparators, wherein each of the plurality of comparators is configured to compare the memory address against a single range.

11. The processor of claim 8, wherein the DHHM further comprises a bypass block operable to bypass the multiplexer.

12. A method comprising:
receiving, by a dynamic heterogeneous hashing module (DHHM) of a memory controller unit (MCU) of a processor, a current memory request to access system memory coupled to the processor via a plurality of memory channels, wherein the DHHM comprises a plurality of specific-purpose hashing functions that define different interleaving sequences for memory requests to alternately access the plurality of memory channels and a general-purpose hashing function that defines a default interleaving sequence for the memory requests to alternately access the plurality of memory channels;
obtaining, by the DHHM, a memory address of the current memory request;
comparing, by the DHHM, the memory address against memory ranges corresponding to the plurality of specific-purpose hashing functions and the general-purpose hashing function;
identifying, by the DHHM, a requesting functional unit from a plurality of functional units of the processor that originated the current memory request; and
selecting, by the DHHM, one of the plurality of specific-purpose hashing functions or the general-purpose hashing function for the current memory request in view of the requesting functional unit, wherein the selecting comprises selecting a winning hashing function in view of the comparing.

13. The method of claim 12, further comprising:
performing the plurality of specific-purpose hashing functions on the memory address of the memory request;
performing the general-purpose hashing function on the memory address of the memory request;
outputting results of the plurality of specific-purpose hashing functions and general-purpose hashing function as inputs to a multiplexer of the DHHM;
comparing, by a comparator of the DHHM, the memory address with memory ranges corresponding to the plurality of specific-purpose hashing functions and general-purpose hashing function; and
selecting, by the multiplexer, one of the inputs in view of the comparing.

14. The method of claim 13, further comprising bypassing the multiplexer when a bypass block of the DHHM is enabled.

15. The method of claim 12, further comprising organizing, by the MCU, physical memory into a plurality of memory regions, each of the plurality of memory regions corresponding to one of the plurality of specific-purpose hashing functions.

16. The method of claim 12, wherein the general-purpose hashing function is Bit6 XOR Bit13 XOR Bit 19, and wherein one of the plurality of specific-purpose hashing functions is Bit6 XOR Bit9 XOR Bit13 XOR Bit19.

17. The method of claim 12, wherein the general-purpose hashing function is Bit6 XOR Bit13 XOR Bit 19, and wherein one of the plurality of specific-purpose hashing functions is Bit6 XOR Bit9 XOR Bit1 0 XOR Bit13 XOR Bit19.

18. An integrated circuit comprising:
a processor core;
a memory device operable to store code memory and data memory; and
a memory controller unit (MCU) coupled between the processor core and the memory device, wherein the MCU is to:
  load a plurality of values in configuration registers to program a plurality of specific-purpose hashing functions of a dynamic heterogeneous hashing module (DHHM);
  receive a current memory request to access the memory device via a plurality of memory channels, wherein the plurality of specific-purpose hashing functions define different interleaving sequences for memory requests to alternately access the plurality of memory channels;
  identify a requesting functional unit from a plurality of functional units of the processor that originated the current memory request, wherein the DHHM to receive a memory address of the current memory request to identify the requesting functional unit; and select one of the plurality of specific-purpose hashing functions for the current memory request in view of the requesting functional unit, wherein the DHHM further to receive outputs from the plurality of specific-purpose hashing functions and a general-purpose hashing function as inputs and to output one of the inputs in view of the one of the plurality of specific-purpose hashing functions.

19. The integrated circuit of claim 18, wherein the DHHM comprises:

a memory address range comparator to receive the memory address of the current memory request to identify the requesting functional unit; and a multiplexer coupled to the memory address range comparator and to receive the outputs from the plurality of specific-purpose hashing functions and the general-purpose hashing function as inputs to the multiplexer, wherein an output of the memory address range comparator is to control the multiplexer to output the one of the inputs in view of the memory address of the current memory request.

20. The integrated circuit of claim 19, wherein the memory address range comparator comprises a plurality of comparators, wherein each of the plurality of comparators is to compare the memory address against a single range.

21. The integrated circuit of claim 19, wherein the DHHM further comprises a plurality of configuration registers to program the plurality of specific-purpose hashing functions.

22. The integrated circuit of claim 19, wherein the memory address range comparator comprises a single comparator to compare the memory address against a plurality of address ranges.

23. The integrated circuit of claim 19, wherein the MCU is to organize physical memory into a plurality of memory regions, each of the plurality of memory regions corresponding to one of the plurality of specific-purpose hashing functions.

* * * * *